Patented Feb. 6, 1951

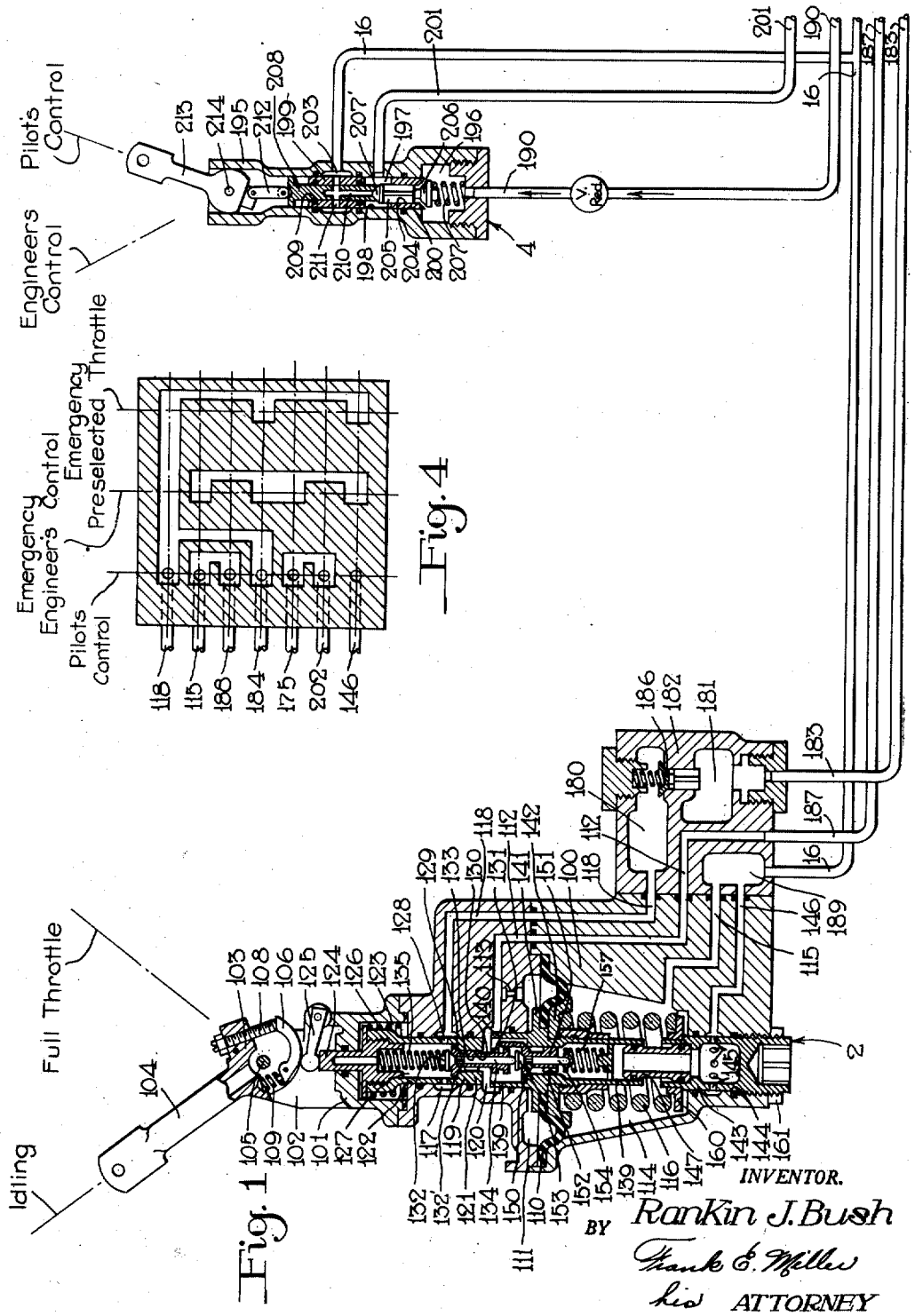

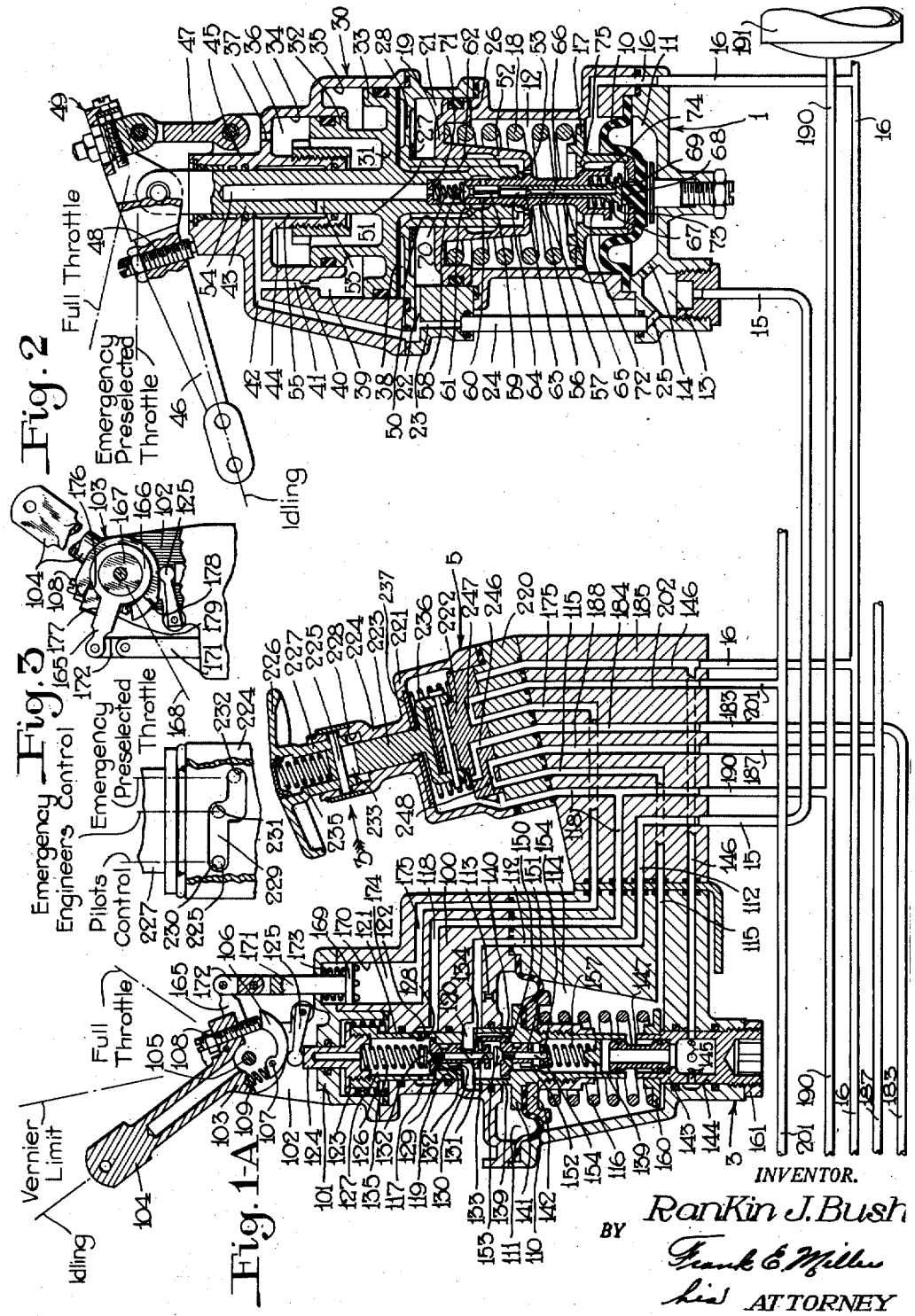

2,540,710

UNITED STATES PATENT OFFICE 2,540,710

FLUID PRESSURE CONTROL APPARATUS

Rankin J. Bush, Greensburg, Pa., assignor to The Westinghouse Air Brake Company, Wilmerding, Pa., a corporation of Pennsylvania Application August 21, 1947, Serial No. 769,845

8 Claims. (Cl. 121—38)

1

This invention relates to fluid pressure control apparatus and more particularly to the type for controlling speed or other operation of a plurality of engines on an airplane of the type having a pilot's control station for the engines and an engineer's control station at or adjacent the engines for also controlling said engines.

In such an apparatus it is desirable that the pilot be provided with means for switching control of the engines to the engineer or for removing such control, in accordance with the specific functions performed by the operators at the two stations preparatory and during normal flight in order to avoid interference of engine control between the stations. It is further desirable that the engineer be able to remove from the pilot's control of an engine in case of emergency such as faulty operation thereof and restore the control to the pilot upon repair of the engine. It is further desirable in case of accidental reduction in pressure of controlling fluid that the engine speed be maintained sufficient to insure safe operation of the plane.

The principal object of the present invention is the provision of an improved fluid pressure control apparatus for accomplishing the above results.

Other objects and advantages will be apparent from the following more detailed description of the invention.

In the accompanying drawings; Figs. 1, 1—A, when the left hand end of Fig. 1 is matched to the right hand end of Fig. 1—A, is a diagrammatic view of a fluid pressure control system embodying one form of the invention; Fig. 2 is a diagrammatic rear view of an operating lever mechanism and lockout lever arrangement shown in Fig. 1—A; portions of the mechanism being broken away for the sake of clarity; Fig. 3 is a diagrammatic cut-away view of a selector valve device operating handle mechanism as viewed in the direction of arrow 3, in Fig. 1—A, and Fig. 4 is a diagrammatic development of connections effected in three positions of said selector valve device.

In actual practice the improved fluid pressure control apparatus is adapted to provide synchronous control of a plurality of engines or other devices from a single operator's control device at one control station and individual control of said engines or devices by individual operator's control devices at another station, such as, respectively, pilots and engineers control stations in an airplane. For the purpose of simplicity in illustrating the invention however, which will be presently described, there is shown in the drawing, only one engine control device, and two operator's control devices therefore, intended to be located at different control stations.

As shown in Figs. 1 and 1—A, reference numeral 1 designates a fluid pressure motor adapted to position a device such as an aircraft engine throttle between idle and full speed positions in accordance with variations in pressure of fluid supplied to said motor between a minimum pressure of say eighty (80) pounds and a maximum pressure of one hundred fifty (150) pounds. Motor 1 is also adapted to automatically respond to an unintended reduction in pressure below the chosen minimum pressure of eighty (80) pounds to move the throttle device to an "Emergency Preselected Throttle" position corresponding to a fast cruising output of the engine to insure safe operation of the airplane. Reference numerals 2 and 3 designate, respectively, a self-lapping fluid pressure pilot's control valve device and a fluid pressure self-lapping engineer's control valve device, located at respective pilot's and engineer's stations on an airplane to control the supply and release of fluid under pressure to and from the fluid pressure motor 1 for thereby controlling operation of the engine. A pilot's interlock valve device 4 is provided which is operative by pilot or co-pilot to one position for rendering fluid pressure limiting means associated with the engineer's control device 3 effective to limit the range of operation of device 3 to a vernier range, allowing the engineer to tune the engine to synchronization with other engines while the pilot maintains control of the throttle through its full range, and operative to a second position for rendering said limiting means ineffective, thereby allowing the control valve device 3 to be operative through its full range during warmup of the engine prior to taking off or for testing. Reference numeral 5 designates an engineer's emergency selector valve device at the engineer's station operative to a first or normal position whereby either device 2 or device 3 may control operation of motor 1 depending upon the position of the interlock valve device 4. This device 5 is operative to a second or emergency position for removing control of motor 1 from the influence of devices 2 or 4, and to a third or emergency position for rapidly reducing the pressure of fluid in device 1 to atmosphere to render device 1 effective to immediately assume its "Emergency Preselected Throttle" position, as previously mentioned.

Referring to Fig. 1—A, the fluid pressure motor 1 is of the type disclosed and described in detail in Patent No. 2,413,287 issued to R. J. Bush, December 31, 1946, and assigned to the assignee of the present invention.

Briefly then, motor 1 comprises a hollow casing having a flexible diaphragm 10 which is clamped at its outer edge to said casing and is subject to the pressure of fluid in a control chamber 11 at one side and to the pressure of fluid in a spring chamber 12 at its opposite side. Chamber 11 is constantly open to a cavity 13 in the casing by way of a port 14, cavity 13 in turn being constantly open to a combined fluid pressure supply and control pipe 15 connected to the control valve device 3. Chamber 12 is constantly open to a passage and branch of fluid pressure exhaust pipe 16 which may be constantly connected to atmosphere or to an exhaust sump. A follower 17, disposed in chamber 12 and attached to one face of diaphragm 10, accommodates one end of a compression control spring 18, disposed in said chamber and interposed between said follower and a movable piston 19 slidably mounted in a casing bore coaxial with diaphragm 10.

Piston 19 is subject on one side to fluid at atmospheric pressure in chamber 12 and on the other side to the pressure of fluid in chamber 21 which pressure in chamber 21 is the pressure of fluid in supply and control pipe 15, chamber 21 being constantly open to said pipe by way of passages 22, 23, a pipe 24, a passage 25 and cavity 13. Since pipe 15 is normally supplied with fluid at a minimum pressure of about eighty (80) pounds, as an example, the same pressure is effective in chamber 21 to normally maintain piston 19 seated on an annular shoulder 26 against opposition of spring 18. Shims 27, fixed in contact with a wall 28 of chamber 21 provide adjusting means for limiting travel of piston 19 in the direction of said wall.

A power cylinder 30 is disposed on the opposite side of wall 28 in coaxial alignment with piston 19 and contains a differential area power piston means 31 which may comprise two axially arranged spaced apart and connected piston heads 32 and 33, piston head 33 being of greater diameter than piston head 32. Each head 32, 33 is slidably mounted in a respective bore 34, 35 in cylinder 30. Bore 34 is closed by an end wall which together with a limited portion of the adjacent face of piston means 31 defines a chamber 36 which is constantly open to atmosphere by way of port 37. A fluid pressure control chamber 38 is formed by the opposite face of piston means 31 and the wall 28. Between the two piston heads 32, 33 there is a dashpot chamber 39 which is in constant communication with the control and supply pipe 15 by way of a choke 40, passages 41, 42, the passages 22, 23, pipe 24, passage 25 and cavity 13. Supply of fluid under pressure to the control chamber 38 and the release of fluid under pressure therefrom is controlled by pilot valve means which will be hereinafter described.

The power piston means 31 is operatively connected to a rod or stem 43 projecting at one end through a central bore in aligned bosses 44 and 45 disposed, respectively, inside and outside the casing. To the outer projecting end of stem 43 is pivotally connected an operating lever 46 adapted to be connected at one end to a device to be actuated or controlled such as an aircraft engine throttle (not shown). The opposite end of lever 46 is pivotally connected to one end of a link 47, the other end of which link is pivotally connected to a projecting ear of the casing. The lever is provided with an adjustable stop member in the form of a screw 48 which is adapted to engage with the boss 45 for defining a normal rest or idle position of lever 46. The lever is also provided with means 49 for adjusting the fulcrum of the lever.

Stem 43 also projects on the opposite side of piston head 33 and extends through chamber 38 and wall 28 into a bore 50 in boss 51 attached to wall 28, which boss extends centrally through chamber 21 and into a central opening in piston 19. A sleeve 52 attached to piston 19 encircles boss 51 and a stop wall 53 is provided at one end of the sleeve for engagement with the inner end of stem 43. An axial bore, forming a fluid pressure supply passage 54, is provided in stem 43 which bore is constantly open, by way of a port 53 and an annular passage 55, to passage 42 and thence to the supply and control pipe 15. A valve member 56 is disposed in chamber 12 and is attached to the projecting end of stem 43. A portion of member 56 projects into bore 54 in stem 43 while an oppositely extending portion projects into follower 17 attached to diaphragm 10. A central bore 57 extends longitudinally through member 56 from end to end. A supply valve 58, having a fluted stem 59 slidably mounted in bore 57, is arranged to open and close bore 54 to bore 57 and thereby to ports 60 in member 56, thence to a port 61 in stem 43 and thereby to an annular clearance passage 62 encircling stem 43 within boss 51 which clearance passage is connected to control chamber 38. A release valve 63 is secured to one end of a pin 64, the opposite end of the pin being connected to fluted stem 59 of the valve 58. Pin 64 is of lesser diameter than the diameter of bore 57 to allow for passage of fluid under pressure past it. A sleeve 65 extends into the bore 57 in member 56 and is slidably mounted in the member for engagement with release valve 63 which is operative for opening and closing ports 60, connected as above mentioned to chamber 38, to a central bore 66 extending through sleeve 65. A head 67 is attached to the outer end of sleeve 65 for contact with a boss 68 projecting from diaphragm 10, and a restricted port or choke 69 in said head connects bore 66 to chamber 12, which chamber is open to the atmosphere or sump, by way of pipe 16. A bias compression spring 70 is disposed in bore 54 in stem 43, and is interposed between a seat 71 fixed in said bore and the supply valve 58 for urging said valve to a normally closed position. A second bias compression spring 72 is interposed between a shoulder formed in the end of member 56 and a flange 73 attached to head 67 for urging sleeve 65 in the direction of diaphragm 10. Movement of sleeve 65 relative to member 56 in the direction of stem 43 is limited by contact between flange 73 and the end of a flange 74 attached to member 56. Movement of member 56 away from diaphragm 10 is limited by engagement of flange 74 with a rib 75 attached to follower 17.

Referring to Figs. 1 and 1—A, both the pilot's control valve device 2 and the engineer's control valve device 3 are substantially alike with the exception of fluid pressure means comprised in the last named device for limiting operation thereof to a vernier range. For the sake of brevity, where the following description of device 2 also applies to device 3 the description will not be duplicated and identical elements will be designated by the same reference numerals.

Both of the valve devices 2 and 3 are of the type described in detail in Patent No. 2,398,877 issued to A. J. Bent, April 23, 1946, and assigned to the assignee of the present invention. Briefly, therefore, each of the control valve devices 2 and 3 comprises a self-lapping valve portion enclosed in a casing 100 and also comprises an operator's lever portion which is mounted on the casing and is arranged to actuate said valve portion.

The operator's lever portion comprises a pedestal 101 suitably mounted on casing 100 and having two spaced apart upstanding lugs 102 for supporting the hub 103 of an operator's lever 104. The hub 103 is pivotally connected to said lugs by a shaft 105. A cam 106 for operating the self-lapping valve portion, later to be described, is arranged to be positioned by lever 104. The cam is connected by means of a pin 107 to hub 103 and is urged against an adjusting screw 108 by a spring 109 to define a chosen operating position, the adjusting screw being mounted in the hub.

The self-lapping valve portion comprises a flexible diaphragm 110 having at one side a fluid pressure chamber 111 constantly open to a fluid pressure delivery passage 112 by way of a restricted stabilizing passage 113, and having at the opposite side a fluid pressure chamber 114 constantly open to a fluid pressure passage 115. A control spring 116 is disposed in chamber 114 urging diaphragm 110 in the direction of chamber 111. A fluid pressure supply chamber 117 is provided in the casing which is connected to a fluid pressure delivery passage 118, and fluid pressure delivery chamber 120 is also provided which is connected to delivery passage 112. A slidable valve seat sleeve member 121 extends through bore 119, chamber 117, and a bore 122 into a spring chamber 123 formed in pedestal 101. Attached to member 121 is a stem 124 which projects through an opening in pedestal 101 for engagement with a cam follower 125 pivotally secured to the lugs 102. A spring 126 disposed in chamber 123 urges stem 124 against follower 125 and said follower against cam 106.

A supply valve chamber 127 is formed in valve seat sleeve member 121 which is open, by way of ports 128, to supply chamber 117. Contained in this chamber 117 is a supply valve 129 which is for the purpose of opening and closing communication between chamber 127 and a bore 130 in the member 121 which bore is adapted to connect said chamber 117 with delivery chamber 120. The valve 129 is provided with a fluted stem 131 which is slidably guided in bore 130. A pilot valve 132 is provided which is arranged to seat on valve 129 for opening and closing communication between chamber 127 and a relatively small port 132' in valve 129 extending between bore 130 and a bore 133 in the sleeve member. The valve 132 is provided with a stem 134 which is slidably guided in the bore 133 in the valve stem 131. A bias spring 135 disposed in chamber 127 is provided which urges valves 132 and 129 to normally closed positions.

Delivery chamber 120 is open to a hollow sleeve 139 extending through a bore 140 which extends between chambers 120 and 111, and through diaphragm 110 into chamber 114. Sleeve 139 is secured to move with diaphragm 110, being attached to a follower 141 at one side of said diaphragm which is clamped to a follower 142 at the opposite side of said diaphragm and forms a seat for spring 116. A hollow sleeve 143, secured in a casing bore 144 by screw threads, also projects into chamber 114 coaxially with and spaced away from sleeve 139, the interior of the sleeve 143 being open to a groove and passage 146 by way of ports 145. A floating hollow sleeve 147, slidably mounted at its opposite ends in sleeves 139 and 143, completes a conduit connecting delivery chamber 120 to exhaust passage 146 via the hollow sleeve members. Sealing rings are provided at various points to prevent leakage past slidable joints.

A release valve 150 is disposed in sleeve 139 for opening and closing the chamber 120 to exhaust passage 146 via the connected sleeves 139, 147, and 143. A fluted stem 151, slidably mounted in a bore 152 in sleeve 139, guides said valve in its travel. A release pilot valve 153 is connected to a stem 154 slidably mounted in a central bore extending through the valve 150 and stem 151. Ports in valve 150 connect the bore therein with bore 152 in sleeve 140, and pilot valve 153 controls communication of fluid under pressure through said ports. A bias compression spring 157 is disposed in sleeve 139 interposed between a foraminated partition and the projecting end of stem 154 in such a manner as to urge pilot valve 153 against the projecting end of stem 134 attached to the supply pilot valve 132. The release valve 150 is loosely connected to the projecting end of the supply valve stem 131 and is held in a normally seated position by action of spring 135.

The control spring 116 seats at one end on a washer member 160 carried by sleeve 143, so that by inserting a wrench into a socket provided in the outer end of said sleeve the initial compression of said spring may be changed by screwing sleeve 143 in or out of bore 144. A lock nut 161 is provided for preventing unintended movement of sleeve 143 out of a desired adjusted position.

As will apply only to the engineer's control valve device 3, and as shown in Figs. 1—A and 2, the fluid pressure limiting means comprises a lockout lever 165 which is attached to a ring 166 slidably mounted on a portion 167 of hub 103. The lever 165 is operatively connected to an actuating piston 169 slidably disposed in a bore 170 in casing 100 and connected to said lever by a rod 171 and a link 172. A spring 173 in bore 170 at one side of piston 169 is arranged to urge said piston in the direction of a fluid pressure chamber 174 at its opposite side, said chamber being open to a fluid pressure passage 175 leading to the engineer's emergency selector valve device 5. A shoulder 176 is formed in hub 103 for engagement with a corresponding shoulder 177 on lever 165 to limit travel of operating lever 104 when positioned as shown in the drawing. A shoulder 178 in hub 103 is provided to engage a shoulder 179 on lever 165 to define an idle position of lever 104 as indicated by a dot and dash line 168 in Fig. 2.

Referring to Figs. 1 and 1—A, the fluid pressure supply passage 118 in the pilot's control valve device 2 is connected by way of a branch passage and connected chambers 180 and 181 in a pipe bracket 182 to a pipe 183 leading to the engineer's emergency selector valve device 5 by way of a passage 184 in a pipe bracket 185 secured to the engineer's control valve device, there being a check valve 186 in bracket 182 between said chambers therein to allow fluid under pressure to flow only in the direction of said supply passage 118 in said pilot's control valve device 2. Delivery passage 112 in pilot's control valve device 2 is connected to the selector valve device 5 by way of a branch passage in bracket 182, a pipe 187 and a passage 188 in bracket 185. Passages 115 and 146 in pilot's control valve device 2 are both connected to the fluid pressure exhaust pipe 16 by way of a common cavity 189 in pipe bracket 182.

In the engineer's control valve device 3, the fluid pressure supply passage 175 is connected to the selector valve device 5 by way of a branch passage in the bracket 185. Fluid pressure supply passage 118 is connected to a fluid pressure supply pipe 190 by way of a branch of said passage in bracket 185, pipe 190 in turn being connected to a fluid pressure reservoir 191 adapted to be supplied with fluid under pressure from a suitable source such as a compressor (not shown). Fluid pressure delivery passage 112 in engineer's control device 3 is constantly open to the combined fluid pressure supply and delivery pipe 15, connected to motor 1, by way of a branch of passage 112 in bracket 185. Passage 115 in valve device 3 is connected by way of a branch of passage 115 in bracket 185 to selector valve device 5, and passage 146 in device 3 is connected to a branch of exhaust pipe 16 by way of passage 146 in said bracket.

Referring to Fig. 1 the pilot's interlock valve device 4 is provided with the usual casing 195 having a fluid pressure supply chamber 196 constantly open to the fluid pressure supply pipe 190. This chamber is adapted to be connected to a fluid pressure delivery chamber 197, formed in a bore 198 between two spaced apart sleeve bushings 199 and 200 mounted in said bore. Chamber 197 is also adapted to be connected to a fluid pressure delivery pipe 201 having a connection to the emergency selector valve device 5 by way of a branch of said pipe and a passage 202 in pipe bracket 185. Within the casing there is a fluid pressure exhaust chamber 203 formed by a groove in bore 198 encircling bushing 199, chamber 203 being open to a branch of fluid pressure exhaust pipe 16. A reducing valve device is provided in pipe 190 to provide suitable working pressure. A central bore 204 in bushing 200, extending between chambers 196 and 197, accommodates a fluted valve stem 205 slidably mounted therein. Disposed in chamber 196 and attached to one end of stem 205 is a supply valve 206 arranged to engage or disengage with a seat formed in the end of said bushing for opening and closing chamber 196 to bore 204 and consequently to chamber 197. A spring 207, disposed in chamber 196, is arranged to urge valve 206 toward its seat in bushing 200. A release valve 207', disposed in chamber 197, is attached to the opposite end of stem 205, and is adapted to engage a seat formed in the projecting end of a rod 208 which is arranged to be reciprocated in a central bore 209 extending through bushing 199 for opening and closing chamber 197 to a central passage 210 in said rod. Passage 210 is arranged to be open to exhaust chamber 203 by way of aligned radial ports 211 in bushing 199 and rod 208. The opposite end of rod 208 is operatively connected by a link 212 to a pilot's lever 213, pin connected at 214 to casing 195. Link 212 is eccentrically connected to lever 213 so that movement of said lever from its "Pilot's Control" position as shown to an opposite "Engineer's Control" position indicated by dot-and-dash lines actuates rod 208 upwardly a greater distance than the supply valve 206 travels to seat.

The engineer's emergency selector valve device 5 may comprise a casing having a valve seat section 220 and a cap or cover section 221 which are secured together and to the pipe bracket 185 adjacent to the engineer's control valve device 3. The cover section 221 is provided with a bore containing a rotary valve 222, the face of which slidably contacts with the valve seat face formed in the valve seat section 220 and the peripheral edge surface of which slidably contacts with the cover section 221 within said bore. The rotary valve is operatively connected to the one end of an operating stem 223 suitably journaled in a sleeve 224 attached to the cover section 221 of the casing. The opposite end of stem 223 terminates within sleeve 224 and has secured thereto by means of a pin 225 an operating knob or handle 226 through the medium of which the stem and thereby the rotary valve 222 may be rotated. A sleeve 227, attached to handle 226, encircles the end of stem 223 and is adapted to reciprocate and rotate within an accommodating annular groove 228 in sleeve 224. A guide slot 229, the development of which is shown in Fig. 3, is formed in sleeve 224, which slot provides three spaced apart shoulders 230, 231, 232, against which projecting ends of pin 225 may seat to define three positions, "Pilot's Control," "Emergency Engineer's Control," and "Emergency Preselected Throttle," respectively, of the selector valve device. Pin 225 fits in bores in sleeve 227 and a slot 233 in stem 223 so that said pin and stem will rotate with handle 226. Clearance is provided between the end of sleeve 227 and the end of groove 228 so that from the "Emergency Engineer's Control" position handle 226 may be depressed and rotated to "Emergency Preselected Throttle" position, moving pin 225 consecutively downwardly and toward shoulder 232 within guide slot 229, and downwardly in slot 233 as subsequent rotation of said pin rotates stem 223. A compression spring 235 is arranged to bias handle 226 upwardly. A compression spring 236 is provided for loading valve 222, interposed between said valve and a seat member 237 arranged to rotate with stem 225 and slide in an accommodating groove in cover portion 221.

*Operation*

In operation, let it be assumed initially that the operating lever 104 of the pilot's control valve device 2 is in idling position with both its supply valve 129 and its release valve 150 closed, that control spring 119 or device 2 is adjusted for substantially no initial compression, that operating lever 104 of the engineer's control valve device 3 is in idling position also with its release valve closed and its supply valve open; that control spring 119 of device 3 has been adjusted for an initial compression sufficient to balance with a delivery pressure of eighty (80) pounds in chamber 111 for example; that operating lever 213 of pilot's interlock valve device 4 is in "Pilot's Control" position; that the engineer's emergency selector valve device 5 is in "Pilot's Control" position; and further assume that reservoir 191 is charged with fluid at a pressure of five hundred (500) pounds for example.

Fluid under pressure from reservoir 191 then flows by way of pipe 190 and a branch thereof to passage 118 in pipe bracket 185 whence it flows to the supply chamber 117 of the engineer's control valve device 3 and to the corresponding chamber 117 in the pilot's control valve device 2 by way of the rotary valve seat 220, the rotary valve chamber, a cavity 246 in the valve 222, the passage 184, the pipe 183 chambers 181 and 180 in bracket 182, and passage 118 in device 2. With supply valve 129 closed in device 2, fluid under pressure in chamber 117 at this time is thereby prevented from flowing to delivery chamber 120 of said device. At the same time fluid under pressure supplied to passage 118 in bracket 185 flows by way of connected branches of said passage to supply chamber 117 of the engineer's control valve device 3 and the supply valve 129 thereof being open flows through ports 128, chamber 127 and bore 130 in sleeve 121 into delivery chamber 120 of said device, whence it flows by way of delivery passage 112 in device 3, the branch thereof in bracket 185, and the combined fluid pressure supply and control pipe 15 to the cavity 13 in fluid pressure motor 1. In motor 1 fluid under pressure in cavity 13 flows to control chamber 11 by way of port 14, and also to chamber 21 by way of passage 25, pipe 24, and passages 23 and 22. From passage 22 fluid under pressure also flows to dash-pot chamber 39 by way of passages 42, 41 and choke 40, and by way of passages 42 and annular passage 55 to supply passage 54 in stem 43 where the seated supply valve 58 prevents the flow of fluid under pressure from said passage 54. When pressure of fluid in chambers 11, 21, and 39 in motor 1 reaches a value of eighty (80) pounds the piston arrangement 31 assumes its position as shown in the drawing maintaining the operating lever 46 disposed in its idle position, the piston 19 assumes its normal position seated against shoulder 26 against opposition of spring 18; as shown, and diaphragm 10 assumes a position as shown in which supply valve 58 and exhaust valve 63 are seated and closed. At the same time, in device 3, the pressure of fluid in chamber 111, open to delivery chamber 120 by way of choke 113, becomes effective to overcome action of spring 116 and move diaphragm 110 in the direction of chamber 114 sufficiently to close the supply valve 129 and thereby maintain the minimum pressure of eighty (80) pounds, for example, in the fluid pressure motor 1. It will be understood that as diaphragm 110 moves as above described, action of spring 135 forces the unseated supply valve 129 and release valve 150 to follow the motion of said diaphragm until valve 129 seats on member 121 to assume its closed position in which it is shown in the drawing.

At the same time, fluid at a chosen pressure of say five hundred (500) pounds, supplied to pipe 190 flows by way of the reducing valve device to supply chamber 196 in the pilot's interlock valve device 4 at a reduced pressure, whence it flows by way of unseated supply valve 206, bore 204, chamber 197 in device 4 to pipe 201 connected to passage 202 in bracket 185. From passage 202 the fluid at reduced pressure flows by way of a branch of said passage in seat 220, and a cavity 247 in rotary valve 222 to a passage 175 in seat 220, bracket 185, and engineer's control device 3, where it flows to chamber 174 beneath piston 169 and becomes effective to position said piston against action of spring 173 in which position it is shown in the drawing. The lockout lever 165 connected to piston 169 through link 172 and rod 171 attached to said piston, is therefore positioned as shown for limiting movement of operating lever 104 of the engineer's control valve device 3 to travel between "Idling" and "Vernier Limit" positions as indicated by the respective dot-and-dash lines in Figs. 1—A and 2.

Now let it be assumed that the pilot desires to increase the speed of the engine to a degree above idling speed. To accomplish this he moves the lever 104 of control device 2 out of "Idling" position in the direction of "Full Throttle" position and this movement rocks cam 106 and displaces stem 124 downwardly, as viewed in the drawing, moving the supply valve seat formed in member 121 away from the supply valve 129 which is prevented from moving therewith by the release valve seated on follower 110 and connected to valve 129. Fluid under pressure then flows past the unseated supply valve 129 to chamber 120 and thence through passage 112 and pipe 187 to passage 188 in pipe bracket 185 secured to the engineer's control valve device 3, and from said passage 188 to chamber 114 in device 3 by way of a cavity 248 in rotary valve 222 and passage 115.

In device 3, fluid under pressure thus supplied to chamber 114 deflects diaphragm 110 in the direction of chamber 111, carrying follower 141, release valve 150, and release pilot valve 153 with it, and consecutively unseating supply pilot valve 132 and supply valve 129, whereupon fluid under pressure flows from chamber 127 to delivery chamber 120, thence through passage 112 and pipe 15 to chambers 11, 21, 39 and supply passage 54 in fluid pressure motor 1 constantly open to pipe 15 as previously described.

In the pilot's control valve device 2, fluid under pressure supplied to chamber 120 flows through restricted stabilizing passage 113 to chamber 111 above diaphragm 110 and when the pressure of fluid in chamber 111 increases to a sufficient degree with respect to the opposing force of spring 116, said pressure moves diaphragm 110 in the direction of chamber 114 which is open to the atmosphere via passage 115 and pipe 16, thereby permitting closing of the supply valve 129 by action of spring 135 to thus limit the pressure of fluid obtained in chamber 120 in accordance with the position of the operating lever 104. Since chamber 120 of the pilot's control valve device 2 is in communication with chamber 114 of the engineer's control valve device 3 the pressure of fluid in said chamber 114 is also in accordance with the position of the operating lever 104 of device 2.

At substantially the same time, in the engineer's control valve device 3, fluid under pressure supplied to chamber 120 flows by way of stabilizing passage 113 to chamber 111 above diaphragm 110; and when the pressure of fluid in chamber 111 increases in degree sufficient to overcome the opposing action of pressure of fluid in chamber 114 aided by spring 116, the diaphragm 110 will be moved in the direction of chamber 114 to permit closing of the supply valve 129 by spring 135 to thereby limit the pressure of fluid supplied to the fluid pressure motor 1 via passage 112 and pipe 15 in accordance with the pressure of fluid provided in chamber 114 of device 3 by the pilot's control valve device 2.

In the fluid pressure motor 1 the pressure of fluid attained in control chamber 11 deflects diaphragm 10 in the direction of chamber 12 in opposition to the force of spring 18 to a position in which such force balances the action of the pressure of said fluid, and this deflection moves sleeve 65 within member 56 to unseat supply valve 58 against the opposing action of spring 70 allowing fluid under pressure to flow from supply passage 54 to chamber 38 by way of bore 57, groove 60, and passages 61 and 62. Since a greater area of the piston assemblage is exposed to the pressure of fluid in chamber 38 than to the same pressure of fluid in chamber 39, fluid under pressure in chamber 38 causes the piston assembly 31 and stem 43 to move in the direction of chamber 39. The stem 43, as it moves relative to sleeve 65, brings the member 56 attached to said stem into contact with supply valve 58, thus closing off further supply of fluid under pressure to chamber 38 at which time further movement of piston assemblage 31 ceases. The stem 43, as it is thus moved, actuates the operating lever 46, assumed to be attached to the engine throttle, to a position for causing acceleration of the engine to a degree determined by the increase in pressure of fluid supplied to chamber 11. Action of pressure of fluid in dash-pot chamber 39 is such as to dampen motion of piston assemblage 31 to more accurately position lever 46 and prevent over-travel and hunting of motor 1. Pressure of fluid in chamber 21 maintains piston 19 seated against shoulder 26.

Since the position of operating lever 46 of motor 1 connected to the engine throttle determines speed of the engine, which position is, in turn, determined by the pressure of fluid supplied to control chamber 11 by the engineer's control valve device 3, which is proportional to the pressure of fluid supplied to chamber 114 in device 3 by the pilot's control valve device 2, and further, since the last named pressure of fluid is determined by the relative position of the operating lever 104 of the pilot's control valve device 2 between "Idling" and "Full Throttle" positions, it will be seen that the speed of the engine will correspond to the position of said lever 104 out of idling position.

If the pilot desires to further increase the speed of the engine, he moves the control lever 104 of control valve device 2 further in the direction of "Full Throttle" position to thereby increase the pressure of fluid in chamber 114 of the engineer's control valve device 3 which responds to such an increase to correspondingly increase the pressure of fluid in control chamber 11 of fluid pressure motor 1, and render said motor responsive to supply fluid under pressure to power piston assemblage 31 and thus move operating lever 46 to a position for effecting an increase in the speed of the engine in proportion to the degree of movement of said lever 104.

If the pilot desires to reduce the speed of the engine, he moves lever 104 of the pilot's control valve device 2 back toward "Idling" position. This movement allows spring 126 to move member 121 upwardly, as viewed in the drawing, carrying pilot valve 132, supply valve 129, pilot valve 153 and release valve 150 with it to consecutively unseat release valves 153 and 150, allowing fluid under pressure to flow from chamber 114 in control valve device 3 via chamber 120 in control valve device 2 to exhaust pipe 16. The flow of fluid from said chamber 120 being by way of bore 152 in sleeve 139, floating sleeve 147, sleeve 143, ports 145, passage 146 and chamber 189 in bracket 182. In device 2 reduction in pressure of fluid in chamber 120 is reflected in chamber 111 above diaphragm 110 and when said reduction reaches sufficient degree, the spring 116 becomes effective to move diaphragm 110 and attached follower 141 upwardly to reseat release pilot valve 153 and release valve 150 to thereby limit the reduction in pressure of fluid in chamber 114 of control valve device 3 in accordance with the new position of control lever 104 of the pilot's control valve device 2.

This reduction in pressure of fluid in chamber 114 of the control valve device 3 allows pressure of fluid in chamber 111 above diaphragm 110 to become effective to move said diaphragm downwardly in the direction of said chamber 114, carrying follower 141 with it and thereby consecutively unseating release pilot valve 153 and release valve 150 to allow fluid under pressure to flow from chambers 11, 21, 39 and passage 54 in fluid pressure motor 1 via chamber 120 in device 3 to the exhaust pipe 16 by way of bore 152 in sleeve 139, floating sleeve 147, sleeve 143, ports 145 and passage 146 in casing 100 and bracket 185. The reduction in pressure of fluid in chamber 120 is reflected in chamber 111 above diaphragm 110 by way of stabilizing passage 113 and when said reduction is of sufficient degree, the combined action of the pressure of fluid in chamber 114 and of spring 116 moves follower 141 and diaphragm 110 to reseat valves 153 and 150 to thereby limit the pressure fluid in fluid pressure motor 1 in accordance with the pressure of fluid in chamber 114 of device 3.

In fluid pressure motor 1, the reduced pressure of fluid in chamber 11 allows control spring 18, acting through follower 17, to deflect diaphragm 10 in the direction of said chamber a distance proportional to the degree of the pressure reduction to thus render spring 72, which urges head 67 of sleeve 65 against boss 68 of diaphragm 10, effective to move said sleeve away from release valve 63 to allow pressure of fluid in chamber 38 to reduce past the unseated release valve 63 to bore 66 in said sleeve and thence through the restricted release port 69 to chamber 12 and exhaust pipe 16. As soon as pressure of fluid is reduced in chamber 38 sufficiently with respect to pressure of fluid in chamber 39, the piston assemblage 31 will move in the direction of chamber 38, carrying stem 43 and attached member 56 with it until release valve 63 reseats on sleeve 65 to prevent further release of pressure from chamber 38, whereupon further movement of piston means 31 ceases. The stem 43 as it is thus moved actuates the operating lever 46 toward "Idling" position and thereby assumes a position between "Idling" and "Full Throttle" positions in accordance with the degree of pressure reduction in control chamber 11, thus reducing the speed of the engine. Again action of dash-pot chamber 39 in combination with action of choke 40 causes a snubbing action on the piston assemblage 31 during movement which assures the stabilization and accurate adjustment of said assemblage. The pressure of fluid in chamber 21 maintains piston 19 seated against shoulder 26 during normal operation of motor 1 between the assumed operating pressure limits of eighty (80) to one hundred fifty (150) pounds.

If the lever 104 of the pilot's control valve device 2 is returned further toward "Idling" position, a further reduction in pressure of fluid in chamber 114 of the engineer's control valve device 3, and in chamber 11 of the fluid pressure motor 1 is effected. If lever 104 of device 2 is returned to "Idling" position, pressure of fluid in chamber 114 of device 3 is reduced to atmospheric pressure and the device 3 is caused to function to reduce the pressure of fluid in control chamber 11 of motor 1 to the chosen minimum pressure of eighty (80) pounds. In response to each successive reduction in pressure of fluid in chamber 11 of motor 1, the diaphragm 10 deflects accordingly, allowing the unseating of release valve 63 to reduce the pressure of fluid in chamber 38. In response to the reduction in the pressure of fluid in chamber 38 the piston assemblage 31 in motor 1 will function to reposition operating lever 46 and reduce the speed of the engine in proportion to the degree of reduction in pressure in chamber 11, whereupon release valve 63 reseats to prevent further reduction of pressure in chamber 38. When pressure of fluid in chamber 11 in motor 1 is reduced to eighty (80) pounds, the operating lever 46 moves to "Idling" position as shown in the drawing.

It will thus be seen that when the operating lever 104 of the pilot's control valve device 2 is returned to "Idling" position, the fluid pressure motor 1 is caused to respond to return its lever 46 to its corresponding "Idling" position for actuating the throttle to idle the engine speed, while upon movement of said lever 104 up to and including "Full Throttle" position, the lever 46 of motor 1 will be correspondingly positioned simultaneously to obtain corresponding speed of the engine.

When the pilot is controlling the speed of the engine, the engineer may desire to make slight adjustment of the speed of the engine in order to bring its speed into synchronism with the speed of other engines on the same airplane. Let it be assumed that the engineer desires to slightly increase the speed of the engine. He will move lever 104 of the engineer's control valve device 3 out of "Idling" position in the direction of the "Vernier Limit" position. This movement will rock cam 106 of device 3 and cause downward movement of stem 124 and thereby sleeve 121 in opposition to spring 126 causing said sleeve 121 to unseat from supply valve 129 which is restrained from moving with said sleeve by the spring 116 acting through follower 141 and release valve 150. Fluid under pressure then flows from chamber 127 to delivery chamber 129 and thence to control chamber 11 of fluid pressure motor 1. Pressure of fluid in diaphragm chamber 111 of the device 3 is the same as that existing in chamber 129, chamber 111 being open to chamber 129 by way of stabilizing passage 113, and when this pressure is increased sufficiently to overcome the opposing combined action of pressure of fluid in chamber 114 and spring 116 diaphragm 110 is deflected downwardly allowing spring 135 to reseat supply valve 129 to provide a pressure of fluid in chamber 11 of fluid pressure motor 1 which will be increased above that called for by the position of the lever 104 of the pilot's control valve device 2 by an amount corresponding to the position of lever 104 of the engineer's control valve device 3. The fluid pressure motor 1 will respond to the increased pressure of fluid in chamber 11 as will be readily understood from previous description, to move its lever 146 in the direction of "Full Throttle" position to a position corresponding to said increased pressure and thereby effect the increase in speed of the engine desired by the engineer.

Only a relatively small change in speed of the engine is necessary to bring it into synchronism with any other engine on the airplane when the engine is under control of the pilot, so that, while the lever 213 in pilot's interlock valve device 4 is positioned as shown in the drawing, the maximum travel of the lever 104 of the engineer's control valve device 3 out of "Idling" position is limited to movement to the position "Vernier Limit" in which shoulder 176 on hub 103 attached to said lever 104 is in contact with shoulder 177 of lockout lever 165 which thereby prevents further movement of lever 104 in the direction of "Full Throttle" position. The purpose of the limitation is to prevent the engineer from interfering with the pilot's control of the engine during flight beyond the minor adjustments necessary to bring the engine into synchronism with other engines.

While the engineer's emergency selector valve device 5 is in its normal "Pilot's Control" position in which it is shown in the drawing, if the pilot desires to render the engineer's control valve device 3 effective to control the speed of the engine through its full range, he may remove the limitation imposed upon movement of lever 104 in said device 3 by moving lever 213 of interlock valve device 4 from "Pilot's Control" position to the opposite "Engineer's Control" position. Such a changeover of valve 4 would usually be desirable during warm-up period of the engine prior to take-off to allow the engineer to study the performance of the engine while the operating lever 104 of pilot's control valve device 2 would remain in "Idle" position.

The lever 213 as it moves to "Engineer's Control" position moves rod 208 to a position out of contact with release valve 207' and allowing spring 207 to close the supply valve 206. Fluid under pressure in chamber 174 under piston 169 in the engineer's control valve device 3 then flows by way of passage 175, cavity 247 in rotary valve 222, passage 202, pipe 201, chamber 197 in valve device 4 and the unseated release valve 207' in said device to exhaust pipe 16. Pressure of fluid thus reduced in chamber 174 allows spring 173 to move piston 169 in the direction of chamber 174 moving lockout lever 165, connected thereto, with it until, as will be seen by referring to Fig. 2, shoulder 179 on lockout lever 165 contacts with shoulder 178 on hub 103 of lever 104, or until piston 169 contacts the end wall of bore 170 exposed to chamber 174; lockout lever 165 is thus so positioned that movement of lever 104 of the engineer's control valve device 3 is no longer limited to the range of movement between "Idle" and "Vernier Limit" positions, but is now operable between the extreme limits of "Idle" and "Full Throttle" positions.

The engineer may now move lever 104 of control valve device 3 to any position up to and including "Full Throttle" position for warming up and testing the engine. Movement of lever 104 of device 3 to a new position in direction of "Full Throttle" position, as was described in detail in regard to operation of device 3 within the range between "Idle" and "Vernier Limit" positions, renders said device 3 responsive to supply fluid to control chamber 11 in fluid pressure motor 1 at an increased pressure in accordance with position of said lever 104 and to maintain said pressure so long as said lever remains so positioned, while the increased pressure of fluid in said chamber 11 renders motor 1 responsive to move lever 46 to a new position for increasing the speed of the engine in accordance with said increased pressure in chamber 11.

It will be appreciated that with the pilot's interlock valve device 4 in "Engineer's Control" position and the lever 104 of the pilot's control valve device 2 in "Idle" position and the engineer's emergency selector valve device 5 positioned as shown in the drawing, the operating lever 104 of the engineer's control valve device 3 may be moved from any position intermediate "Idle" and "Full Throttle" toward and including "Idle" position and thereby render said device 3 responsive to reduce the pressure of fluid in control chamber 11 of fluid pressure motor 1 and thus effect positioning of lever 46 thereof to reduce the speed of the engine in accordance with the new position of the lever 104 in device 3.

Under the above conditions, the pilot may take control of the engine away from the engineer by returning lever 213 of the pilot's interlock valve device 4 to "Pilot's Control" position as shown in the drawing. However, the engineer may make any necessary minor adjustments of the engine speed when it is desired to synchronize the speeds of the engines as previously described. Movement of the lever 213 to the "Pilot's Control" position causes the release valve 207 to close and the supply valve 206 to open to again supply fluid under pressure to chamber 174 in the engineer's control valve device 3, thereby moving piston 169 against opposition by spring 173 to return the lockout lever 165 to its position in which it is shown in the drawing. The lever 104 of device 3 is therefore again limited to movement between "Idle" and "Vernier Limit" positions which latter position is defined by contact of the shoulder 177 in lockout lever 165 with shoulder 176 in hub 303.

If, at the time the pilot returns lever 213 to its "Pilot's Control" position, the position of lever 104 of the engineer's control valve device 3 is between "Vernier Limit" and "Full Throttle" position, the consequent return of lockout lever 165 to its position as shown in the drawing will return said lever 104 to "Vernier Limit" position by engagement between shoulders 176 and 177 as will be seen by referring to Fig. 2.

While an engine is under control of the pilot, that is, when the pilot's interlock valve device 4 is in "Pilot's Control" position and the engineer's emergency selector valve device 5 is in "Pilot's Control" position, as shown in the drawing, if it should be desirable for the engineer to take control of the engine from the pilot, for repair of the engine or for reason arising from an emergency situation, the engineer may accomplish this by turning the operating handle 226 of device 5 to "Emergency Engineer's Control" position, blanking off, in bracket 185, passages 138 and 202, and connecting passages 115, 184, and 175 to passage 146 and thereby to exhaust pipe 16. Pipe 183 connected to supply chamber 117 in the pilot's control valve device 2 is vented to atmosphere via the now connected passages 184, 186 and pipe 16, and the pipe 187 connected to the delivery chamber 120 of said device 2 and to passage 188 in bracket 185 is now blanked off so that the pilot's control valve device 2 is rendered ineffective. Chamber 174 beneath piston 169 in the engineer's control valve device 3 is vented to atmosphere via the now connected passages 175, 146 and pipe 16 so that spring 173 moves piston 169 to its limit of travel in the direction of said chamber 174 thereby moving lockout lever 165 to its no limiting position to allow full range movement of lever 104 of device 3 between "Idling" and "Full Throttle" positions. Pipe 201 connected to delivery chamber 197 in the pilot's interlock valve device 4 and to passage 202 in bracket 185 is now blanked off thereby rendering said device 4 ineffective. Chamber 114 in the engineer's control device 3 is vented to atmosphere via the now connected passages 115, 146 and pipe 16, and with operating lever 104 of said device 3 at "Idling" position, said device 3 remains in its initially charged position in which the assumed minimum pressure of eighty (80) pounds is maintained in its delivery chamber 120 and hence in control chamber 11 of fluid pressure motor 1 connected to chamber 120 via pipe 15.

The engineer's control valve device 3 is now rendered effective to control the speed and operation of the engine through fluid pressure motor 1 without interference from the pilot's control valve device 2. The engineer may, if he so desires, either increase or decrease the speed of the engine by movement of operating lever 104 of device 3 through its full range, thus influencing the operation of the fluid pressure motor 1, which will be understood from previous description.

If the engine is then repaired or normal conditions otherwise established, the engineer may transfer control of the engine back to the pilot by returning the selector valve device 5 to "Pilot's Control" position in which it is shown in the drawing, for again connecting the delivery chamber 120 in pilot's control valve device 2 to chamber 114 in the engineer's control valve device 3, for again connecting fluid pressure supply pipe 190 to the delivery chamber 117 of said device 2, and for reconnecting delivery chamber 197 in the pilot's interlock valve device 4 to the chamber 174 in the device 3.

In the event of slow reduction in pressure of fluid in the supply pipe 190, due, for example, to accidental leakage of fluid under pressure out of the system, if said pressure reduces below the pressure of one hundred fifty (150) pounds which is the previously assumed desired maximum working pressure for the fluid pressure motor 1, it will be appreciated that the maximum pressure that can be delivered by either of the control valve devices 2 or 3 to fluid pressure motor 1 under this condition will be the reducing pressure of fluid supplied to said devices from pipe 190. As a consequence of accidental reduction in the pressure of fluid in pipe 190 below one hundred fifty (150) pounds, pressure of fluid may slowly reduce in chambers 11, 21 and 39 in motor 1, when such pressure in pipe 190 becomes less than that previously held in said chambers and said motor will respond to such reduction and move the lever 46, if positioned for operation of the engine other than idling, in the direction of "Idling" position distances corresponding to such reduction, with the result that the engine will thereby be slowed down. If the accidental loss of supply pressure causes the pressure of fluid in chamber 21 to reduce below the assumed normal minimum pressure of eighty (80) pounds, the spring 18 will become effective to move piston 19 in the direction of said chamber 21 until rib 53 attached to said piston contacts a shoulder in the end of stem 43, after which further movement of piston 19 by spring 18 in the direction of chamber 21 carries stem 43 with it and thereby moves lever 46 toward its "Emergency Preselected Throttle" position to increase the speed of the engine above idling speed to assure safe operation of the airplane in flight.

It will be appreciated, that if the accidental reduction in pressure of supply fluid is slow and the airplane is in flight, considerable time may be required for fluid pressure motor 1 to automatically respond to such reduction and move lever 46 to the "Emergency Preselected Throttle" position at which the engine operates at a safe speed, with the result, that during the time of reduced engine speed, safety of airplane might be endangered.

If the engine begins to fail slowly due to the above slow reduction in pressure of supply fluid, the engineer may, if he so desires, move the emergency selector valve device 5 to the "Emergency Engineer's Preselected Throttle" position by turning the operating handle 226 of device 5, as shown in Figs. 1—A and 3, first to "Emergency Engineer's Control" position, and then depressing and rotating it until pin 225 engages shoulder 232 in groove 229. Referring to Fig. 5, in "Emergency Preselected Throttle" position of the selector valve device 5, the supply passage 118 connected to supply pipe 190 in bracket 185 and to supply chamber 117 in the engineer's control valve device 3, and the passage 184 connected to the supply chamber 117 in the pilot's control valve device 2 via pipe 183 are connected by way of a cavity in rotary valve 222 to passage 146 thence to exhaust pipe 16, while passages 115, 188, 175, and 202 in bracket 185 are blanked off by said valve 222. At this time, therefore, the pilot's control valve device 2 is ineffective to influence pressure of fluid in fluid pressure motor 1, having its supply chamber 117 open to exhaust pipe 16 connected to an exhaust sump or to atmosphere, and having its delivery chamber 120 connected to pipe 187 and passage 189 in bracket 185 blanked off by valve 222 in device 5.

With the supply chamber 120 of control device 3 vented to atmosphere by selector valve device 5 in "Emergency Preselected Throttle" position, operating lever 104 and thereby cam 106 of control valve device 3 will be so positioned that sleeve member 121 is disposed away from supply valve 117, thereby allowing pressure of fluid in chamber 21 of fluid pressure motor 1 to rapidly reduce via pipe 15, passage 112, delivery chamber 120, the unseated supply valve 129 and passage 118 connected via rotary valve 222 to exhaust pipe 16. By thus rapidly reducing the pressure of fluid in chamber 21 of motor 1 spring 18 rapidly moves piston 19 its full travel in the direction of said chamber to a position limited by contact with shims 27, carrying with it stem 43, as previously described, and thereby rapidly positioning lever 46 in its corresponding "Predetermined Throttle" position to insure safe operation of the engine during the emergency.

After normal conditions have been established in the fluid pressure supply system, the engineer may return the selector valve device 5 to "Pilot's Control" position, as shown in the drawing, thereby rendering the system operable as before described.

*Summary*

From the above description, it will now be apparent that I have provided an improved fluid pressure control apparatus for controlling the speed of airplane engines whereby a first operator, such as a pilot, at one station may, under normal conditions of engine operation, control the speed of an engine through its full operating range while a second operator, such as an engineer, at another station, may control speed of the engine through a lesser or vernier range for making minor adjustment of engine speed, and whereby at the pilot's discretion, also under normal conditions of engine operation, the pilot may allow the engineer to take control of the engine through its full operating range for testing, warm-up prior to take-off, or the like, and further, whereby at the discretion of the engineer, under emergency conditions of engine operation, the engineer may take over control of the engine through its full operating range from the pilot and return same to the pilot upon reestablishing normal conditions, and still further, whereby under emergency conditions of operation of the fluid pressure supply system the engineer at his discretion may take control of operation of the engine away from the pilot and automatically effect emergency positioning of the engine's throttle to insure operation of the engine at a safe speed.

Having now described my invention what I claim as new and desire to secure by Letters Patent is:

1. In combination, a fluid pressure motor adjustable to assume positions between extreme limits of travel in accordance with variations in pressure of fluid between a certain minimum value and a certain maximum value, said motor comprising means responsive to any reduction in said pressure below said minimum value to position said motor intermediate said limits, control valve means operable to effect said variations, emergency valve means operable to render said control valve means ineffective and to effect said reduction, and means for operating said emergency valve means.

2. In combination, a fluid pressure motor adjustable to assume positions between extreme limits of travel in accordance with variations in pressure of fluid between a certain minimum value and a certain maximum value, said motor comprising means responsive to reduction in said pressure below said minimum value to position said motor intermediate said limits, a first fluid pressure control valve device manually operable from one station to effect said variations, a second fluid pressure control valve device manually operable from a second station to effect said variations, an emergency selector valve device operable from said second station to one position to render said first fluid pressure control valve means ineffective and operable to another position to render both the first and second fluid pressure control valve devices ineffective and to effect said reduction, and means for operating said emergency selector valve means.

3. In combination, a fluid pressure motor adjustable to assume positions between extreme limits of travel in accordance with variations in pressure of fluid between a certain minimum value and a certain maximum value, said motor comprising means responsive to reduction in said pressure below said minimum value to position said motor intermediate said limits, a first fluid pressure control valve device manually operable from one station to effect said variations, a second fluid pressure control valve device manually operable from a second station to effect said variations, fluid pressure limiting mechanism operable to limit range of operation of said second fluid pressure control valve device to less than the range of operation of said first fluid pressure control valve device, a fluid pressure valve device manually operable from said first station to control operation of said fluid pressure limiting mechanism, an emergency selector valve device operable from said second station to render the first and second fluid pressure control valve devices ineffective and to effect said reduction, and means for operating said emergency valve means.

4. In combination, a fluid pressure motor adjustable to assume positions between extreme limits of travel in accordance with variations in pressure of fluid between a certain minimum value and a certain maximum value, said motor comprising means responsive to reduction in said pressure below said minimum value to position said motor intermediate said limits, a first fluid pressure control valve device manually operable from one station to effect said variations, a second fluid pressure control valve device manually operable from a second station to effect said variations, fluid pressure limiting mechanism operable to limit range of operation of said second fluid pressure control valve device to less than the range of operation of said first fluid pressure control valve device, a fluid pressure valve device manually operable from said first station to control operation of said fluid pressure limiting mechanism, and an emergency selector valve device operable from said second station to one position to render said first fluid pressure control valve device ineffective and to another position to render both the first and second fluid pressure control valve devices ineffective and to effect said reduction.

5. In combination, a fluid pressure motor adjustable between extreme limits of travel in accordance with pressure of fluid in a control chamber between a normal minimum value and a maximum value, said motor comprising means responsive to reduction in said pressure below said normal minimum value to position said motor intermediate said limits, a manually operable self-lapping fluid pressure control valve device to effect said variations, said control valve device comprising normally seated supply valve means arranged to cooperate with a supply valve seat to control supply of fluid under pressure from a supply chamber to a delivery chamber connected to said control chamber and normally seated release valve means arranged to cooperate with a release valve seat to control release of fluid under pressure from said delivery chamber to a fluid pressure exhaust passage, an operating lever mechanism arranged to be moved manually to positions between extreme opposite limits of travel of said motor in one direction to dispose said supply valve away from said supply valve seat a distance in accordance with degree of said movement, and in an opposite direction to dispose said release valve away from said release valve seat a distance in accordance with degree of said movement, a spring, and a diaphragm means subject to action of pressure of fluid in said delivery chamber on one side and to action of said spring and pressure of fluid in a chamber on the opposite side arranged to reseat said supply valve means by deflection in one direction and to reseat said release valve means by movement in the opposite direction, and a fluid pressure selector valve device associated with said control valve device manually operable to open said supply chamber to atmosphere to thereby effect said reduction.

6. In combination, a fluid pressure motor adjustable between opposite limits of travel in accordance with variations in pressure of fluid in a control chamber between a normal minimum pressure and a normal maximum pressure, said motor comprising means responsive to reduction in said pressure below said minimum pressure to position said motor intermediate said limits, a first self-lapping fluid pressure control valve device manually operable from a first station to control pressure of fluid in a delivery chamber by supply and release of fluid under pressure to and from said delivery chamber, a second self-lapping fluid pressure control valve device at a second station operable to effect said variations, said second self-lapping fluid pressure control valve device being adapted to effect said variations in response to pressure of fluid in said delivery chamber and comprising manually operable means for effecting operation thereof, and a fluid pressure emergency selector valve device manually operable from said second station to one position to render said first self-lapping fluid pressure control valve device ineffective and to another position to render both the first and second fluid pressure valve devices ineffective and to effect said reduction.

7. In combination, a fluid pressure adjustable motor, two fluid pressure control devices one at each of two different control stations and each comprising a lever having a zone of movement, means controlled by movement of either or both of the levers of said control devices to vary pressure of fluid in said motor, limiting means at one of said stations for limiting movement of the lever of the respective control device to a degree less than the movement of the lever of the other control device and means at the other control station separate from the respective control device for rendering said limiting means either effective or ineffective.

8. In combination, a fluid pressure motor adjustable to assume positions between extreme limits of travel in accordance with variations in pressure of fluid between a certain minimum value and a certain maximum value, said motor comprising means responsive to any reduction in said pressure below said minimum value to position said motor intermediate said limits, two control means, one at each of two control stations, means responsive to operation of either one of said control means or to operation of both of said control means at the same time to vary pressure of fluid in said motor between said limits, vernier means at one of said stations for limiting the degree of control of pressure in said motor by one of said control means to a degree less than by the other control means, and selector means having first, second and third positions and comprising means operative on said first and second positions to subject the first named means to pressure of fluid provided by operation of said control means for controlling said motor and operative in a third position to release fluid under pressure from said first named means, said selector means further comprising means operative on said first position to render said vernier means effective and in said second position ineffective.

RANKIN J. BUSH.

REFERENCES CITED

The following references are of record in the file of this patent:

UNITED STATES PATENTS

| Number | Name | Date |
| --- | --- | --- |
| 1,235,423 | Boyett | July 31, 1917 |
| 1,458,013 | Tampier | June 5, 1923 |
| 1,806,669 | Campbell | May 26, 1931 |
| 2,433,925 | Rush | Jan. 6, 1948 |